United States Patent
Niimi et al.

(10) Patent No.: US 8,779,876 B2
(45) Date of Patent: Jul. 15, 2014

(54) ELECTROMAGNETIC SWITCH

(71) Applicant: Denso Corporation, Kariya (JP)

(72) Inventors: Masami Niimi, Handa (JP); Mitsuhiro Murata, Niwa-gun (JP); Kiyokazu Haruno, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/961,188

(22) Filed: Aug. 7, 2013

(65) Prior Publication Data

US 2013/0321106 A1    Dec. 5, 2013

Related U.S. Application Data

(62) Division of application No. 13/158,985, filed on Jun. 13, 2011, now Pat. No. 8,531,258.

(30) Foreign Application Priority Data

Jun. 11, 2010 (JP) ................................. 2010-134394

(51) Int. Cl.
*H01H 67/02*    (2006.01)

(52) U.S. Cl.
USPC .......................................... 335/126; 335/131

(58) Field of Classification Search
USPC ......................................................... 335/126
See application file for complete search history.

(56) References Cited

U.S. PATENT DOCUMENTS

| | | | |
|---|---|---|---|
| 3,480,893 A * | 11/1969 | Sidor et al. | 335/202 |
| 4,683,454 A | 7/1987 | Vollmer et al. | |
| 5,214,401 A * | 5/1993 | Kimura et al. | 335/126 |
| 5,504,468 A | 4/1996 | Hattori et al. | |
| 5,588,414 A | 12/1996 | Hrytzak et al. | |
| 5,704,585 A | 1/1998 | Hrytzak et al. | |
| 5,812,041 A * | 9/1998 | Ishikawa et al. | 335/126 |

(Continued)

FOREIGN PATENT DOCUMENTS

| | | |
|---|---|---|
| JP | UM-A-S50-154469 | 12/1975 |
| JP | UM-A-S55-015707 | 1/1980 |
| JP | A-07-335431 | 12/1995 |
| JP | A-2009-191843 | 8/2009 |

OTHER PUBLICATIONS

Oct. 26, 2012 Office Action issued in U.S. Appl. No. 13/158,985.

(Continued)

*Primary Examiner* — Shawki S Ismail
*Assistant Examiner* — Lisa Homza
(74) *Attorney, Agent, or Firm* — Oliff PLC

(57) ABSTRACT

An electromagnetic switch is provided which includes: a coil generating magnetomotive force; a frame accommodating the coil and generating a flux path; a resin cover covering an opening of the frame; and a current-supply terminal member energizing the coil. The current-supply terminal member includes: a blade-shaped terminal whose end is connected to the coil and whose another end is drawn out of the resin cover in the axial direction of the electromagnetic switch; and a plate-shaped external connection terminal whose end is joined to an end of the blade-shaped terminal and whose another end is drawn out in the direction intersecting the axial direction. A portion between the ends of the external connection terminal is insert-molded in a terminal anchor block provided with the resin cover. A female terminal of a power supply connector provided at an electric supply line is fitted and electrically connected to the external connection terminal.

4 Claims, 6 Drawing Sheets

(56) References Cited

U.S. PATENT DOCUMENTS

| | | | |
|---|---|---|---|
| 6,204,742 B1 | 3/2001 | Hisamoto et al. | |
| 7,088,208 B2* | 8/2006 | Kurasawa et al. | 335/255 |
| 7,570,138 B2* | 8/2009 | Hirabayashi | 335/131 |
| 7,760,056 B2* | 7/2010 | Utsunomiya et al. | 335/126 |
| 7,948,338 B2* | 5/2011 | Niimi et al. | 335/126 |
| 8,138,863 B2* | 3/2012 | Tanaka et al. | 335/195 |
| 8,138,872 B2* | 3/2012 | Yoshihara et al. | 335/281 |
| 8,143,979 B2* | 3/2012 | Usami et al. | 335/131 |
| 8,198,964 B2* | 6/2012 | Yoshihara et al. | 335/131 |
| 8,212,637 B2* | 7/2012 | Kurasawa | 335/126 |
| 8,237,524 B2* | 8/2012 | Niimi et al. | 335/177 |
| 8,400,243 B2* | 3/2013 | Okada et al. | 335/278 |
| 2006/0132268 A1* | 6/2006 | Hirabayashi | 335/126 |
| 2006/0249210 A1 | 11/2006 | Van Weelden | |
| 2008/0122564 A1* | 5/2008 | Utsunomiya et al. | 335/202 |
| 2009/0183595 A1 | 7/2009 | Niimi | |
| 2010/0264765 A1* | 10/2010 | Haruno et al. | 310/71 |
| 2011/0001589 A1* | 1/2011 | Usami et al. | 335/196 |
| 2011/0084786 A1* | 4/2011 | Niimi et al. | 335/177 |
| 2011/0248803 A1* | 10/2011 | Niimi et al. | 335/202 |
| 2012/0162847 A1* | 6/2012 | Suzuki et al. | 361/206 |
| 2012/0218063 A1* | 8/2012 | Okada et al. | 335/177 |
| 2013/0027157 A1* | 1/2013 | Niimi et al. | 335/2 |

OTHER PUBLICATIONS

Nov. 26, 2013 Office Action issued in Japanese Patent Application No. 2010-134394 (with English translation).

* cited by examiner

CRIMPED to and electrically connected to the end on
ELECTROMAGNETIC SWITCH

CROSS-REFERENCE TO RELATED APPLICATION

This is a Division of application Ser. No. 13/158,985 filed on Jun. 13, 2011, which claims the benefit of priority from earlier Japanese Patent Application No. 2010-134394 filed Jun. 11, 2010, the description of which is incorporated herein by reference.

BACKGROUND

1. Technical Field

The present invention relates to an electromagnetic switch including excitation coils that generate magnetomotive force when current is passed therethrough, and current-supply terminal members that supply current to the excitation coils upon reception of electric power from an external power supply.

2. Related Art

Electromagnetic switches are well known in which a plunger is driven by the attractive force of an electromagnet so that electrical contacts are opened/closed in synchronization with the movement of the plunger.

Such an electromagnetic switch uses a process in which current is passed, via current-supply terminal members, through excitation coils incorporated in a switch frame to allow the excitation coils to generate magnetomotive force by which the plunger is driven. Metal terminal plates, which are generally called blade-shaped terminals, are most frequently used as the current-supply terminal members for supplying current to the excitation coils. As disclosed in JP-A-2009-191843, for example, blade-shaped terminals each have one end which is directly or indirectly connected to an excitation coil in the electromagnetic switch, and the other end which is drawn out in the axial direction of the electromagnetic switch from inside and through a resin cover that covers an opening of the switch frame.

According to the terminal structure mentioned above, wiring work for the electromagnetic switch is facilitated. Specifically, in the wiring work, electric supply lines from outside are connected to the respective blade-shaped terminals. The connection is established by only directly fitting a power supply connector provided at the ends of the electric supply lines to the ends of the blade-shaped terminals (the ends of the blade-shaped terminals, which are drawn out of the resin cover).

Also, recently, a waterproof terminal structure is under development for the purpose of enhancing reliability of electromagnetic switches. FIG. 7 is a general side elevational view illustrating a starter installing an electromagnetic switch of conventional art. The electromagnetic switch shown in FIG. 7 has the terminal structure mentioned above and includes a resin cover 9, a power supply connector 23, and a connector fitting member 20a to be fitted to the power supply connector 23. In order to enhance waterproofing properties, the connector fitting member 20a is provided around the blade-shaped terminals, being integrated into the resin cover 9, while a piece of waterproof rubber, for example, is sandwiched between the connector fitting member 20a and the power supply connector 23. Owing to this terminal structure, an electromagnetic switch having good reliability is produced at low cost.

An electromagnetic switch may be installed in a vehicle starter and arranged in an engine compartment. In an increasing number of cases, however, the installation space in an engine compartment is restricted. This is because on-vehicle devices, such as engine accessories, are increasingly used recently and thus the interior of the engine compartment is crowded with these devices. In particular, in many cases, spatial constraints are imposed on an electromagnetic switch in its axial direction, when the engine in use is a transverse engine, or a small-displacement engine having a small number of cylinders.

Further, an electromagnetic switch to be installed in a vehicle starter may have the terminal structure as mentioned above, i.e. may use blade-shaped terminals that are metal terminal plates with the ends drawn out from inside and through a resin cover in the axial direction of the electromagnetic switch. When such an electromagnetic switch is used, the length of the axial projection in the terminal structure will add constraints to the installation of the switch, the axial projection including a power supply connector to be fitted to the ends of the blade-shaped terminals.

SUMMARY

An embodiment provides a terminal structure in an electromagnetic switch having blade-shaped terminals axially drawn out from inside and through a resin cover, the blade-shaped terminals each being used as a part of a current-supply terminal member, and the terminal structure being able to reduce the length of its axial projection that would add constraints to the installation of the switch.

As an aspect of the embodiment, an electromagnetic switch is provided which includes: an excitation coil which generates magnetomotive force when current is passed therethrough; a switch frame which accommodates the excitation coil and generates a flux path allowing magnetic flux generated by the magnetomotive force of the excitation coil to pass therethrough; a resin cover which is assembled into the switch frame to cover an opening on one end side of the switch frame; and at least one current-supply terminal member which receives power via an electric supply line and energizes the excitation coil, wherein the current-supply terminal member includes: a blade-shaped terminal whose end on one side is directly or indirectly connected to the excitation coil and whose end on the other side is drawn out of the resin cover through the resin cover in the axial direction of the electromagnetic switch; and a plate-shaped external connection terminal whose end on one side is electrically and mechanically joined to an end on the other side of the blade-shaped terminal and whose end on the other side is drawn out in the direction intersecting the axial direction of the electromagnetic switch, a portion between the ends of the external connection terminal being insert-molded in a terminal anchor block which is integrally provided with the resin cover, and a female terminal of a power supply connector provided at an end of the electric supply line is fitted the other side of the external connection terminal.

DETAILED DESCRIPTION OF THE PREFERRED EMBODIMENTS

With reference to the accompanying drawings, hereinafter will be described some embodiments of the present invention.

First Embodiment

Figure 4:
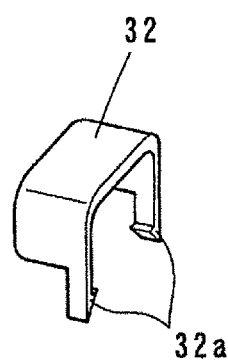
FIG. 4 is a perspective view illustrating a cap used in the electromagnetic switch.
Figure 5:
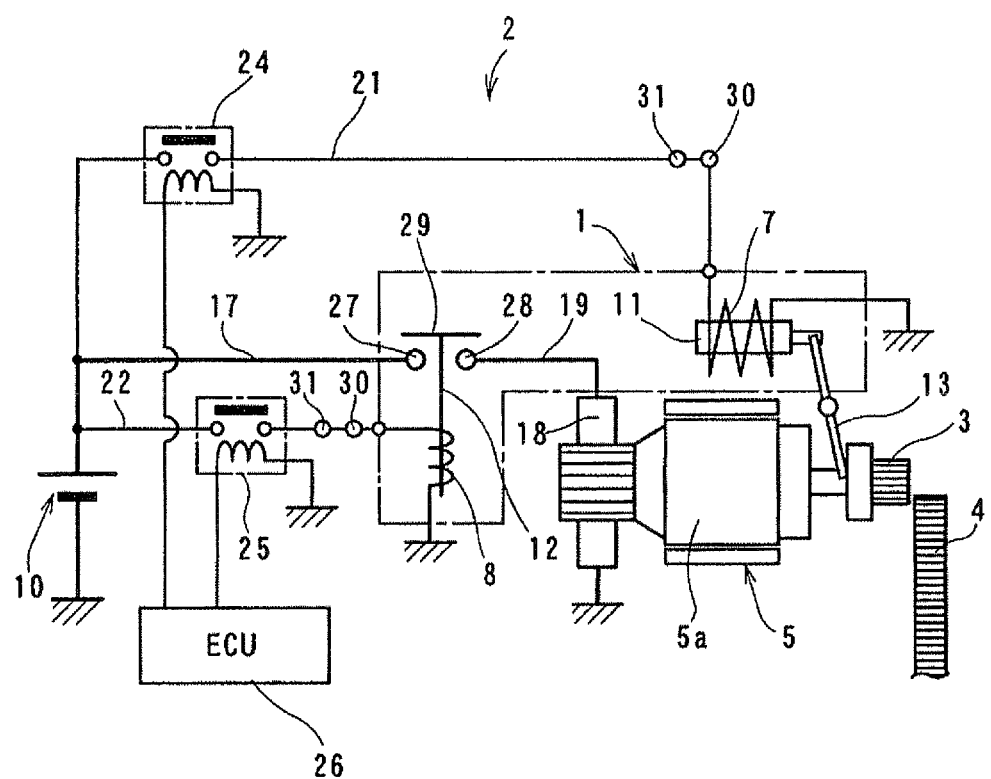
FIG. 5 is an electrical circuit diagram illustrating a starter installing the electromagnetic switch.
Figure 6:
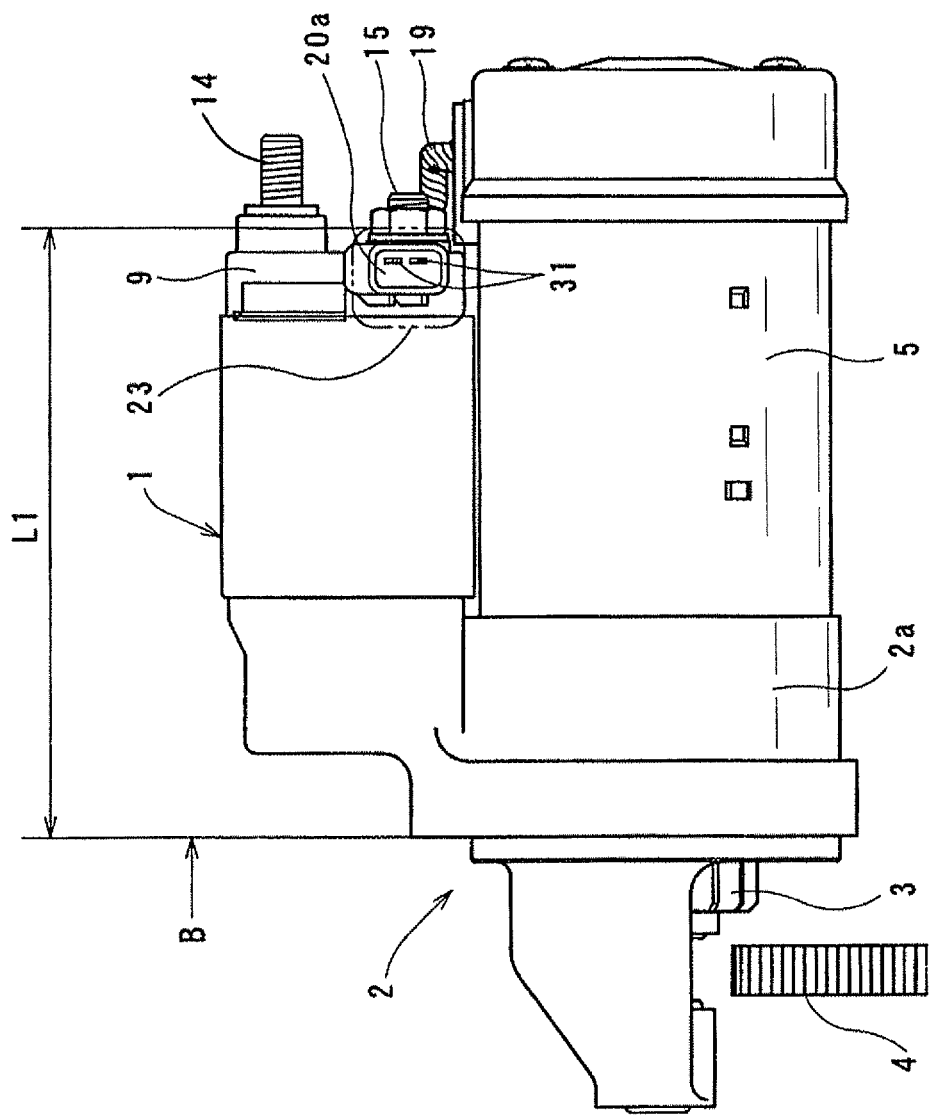
FIG. 6 is a general side elevational view of a starter installing the electromagnetic switch.

Referring to FIGS. 1 to 6, a first embodiment of the present invention is described. FIG. 6 is a general side elevational view of a starter 2 installing an electromagnetic switch 1 of the first embodiment.

The starter 2 has a well-known function. Specifically, the starter 2 includes the electromagnetic switch 1, a pinion 3, a motor 5 and a battery 10 (see FIG. 5). The starter 2 has a well-known function of bringing the pinion 3 into engagement with a ring gear 4 (also see FIG. 5) of an engine to transmit torque of the motor 5 from the pinion 3 to the ring gear 4. The ring gear 4 is rotated by the transmitted torque for the start of the engine.

The electromagnetic switch 1 includes a switch frame 6 (see FIG. 2), first and second excitation coils 7 and 8 (see FIG. 5), a resin cover 9, first and second current-supply terminal members (described later), first and second plungers 11 and 12 (see FIG. 5), and a shift lever 13 (see FIG. 5). The switch frame 6 has a bottomed cylindrical shape. The first and second excitation coils 7 and 8 are accommodated in the switch frame 6. The resin cover 9 is assembled into the switch frame 6 to cover an opening on one end side of the switch frame 6. The first and second current-supply terminal members receive supply of electric power from the battery 10 (see FIG. 5) to supply current to the first and second excitation coils 7 and 8, respectively.

The switch frame 6 is made of iron, for example, and also serves as a yoke that allows magnetic flux to pass therethrough, the magnetic flux being caused by the magnetomotive force of the first and second excitation coils 7 and 8.

The first and second excitation coils 7 and 8 are connected in series in the axial direction (left and right directions as viewed in FIG. 6) of the electromagnetic switch 1. Being supplied with current from the first and second current-supply terminal members, the first and second excitation coils 7 and 8 form electromagnets to drive the first and second plungers 11 and 12, respectively, in conformity with the electromotive force of the electromagnets.

The first plunger 11 is arranged so as to be axially movable along the inner periphery of the first excitation coil 7. When the first plunger 11 is moved being driven by the electromagnet, the pinion 3 is pushed toward the ring gear 4 via the shift lever 13 (see FIG. 5).

The second plunger 12 is arranged so as to be axially movable along the inner periphery of the second excitation coil 8. Electrical contacts (described later) provided at a power supply circuit of the motor 5 are opened/closed in synchronization with the movement of the second plunger 12.

The resin cover 9 has a bottomed cylindrical shape and has a cylindrical body 9a. The cylindrical body 9a has an outer periphery along which a step portion is formed. As shown in FIG. 2, the cylindrical body 9a has an end inserted into the inside of an opening of the switch frame 6 for assemblage into the switch frame 6. In the assemblage, an end portion of the opening of the switch frame 6 is crimped onto the step portion of the cylindrical body 9a for fixation to the switch frame 6 (see FIGS. 1 and 3).

Figure 3:
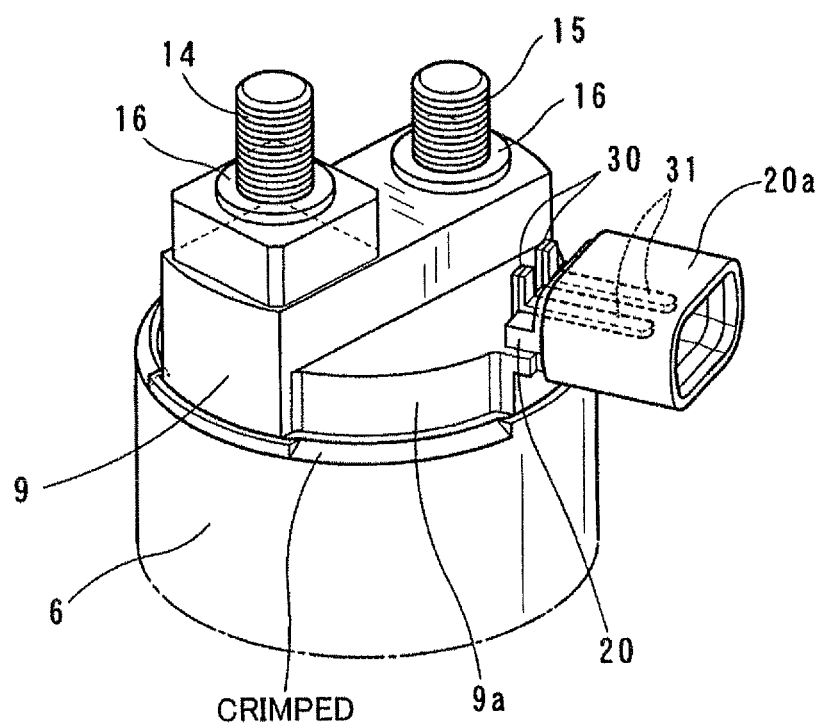
FIG. 3 is a perspective view illustrating a terminal structure of the electromagnetic switch as viewed from the side of the resin cover.

As shown in FIG. 3, the resin cover 9 is provided with a bolt-shaped battery terminal 14 and a bolt-shaped motor terminal 15, each having an outer periphery which is threaded to provide a male screw. Each of the battery terminal 14 and the motor terminal 15 is fixed to the resin cover 9 via a washer 16. The battery terminal 14 is, as shown in FIG. 5, electrically connected to a terminal of a battery cable 17 which is connected to a positive-side terminal of the battery 10. The motor terminal 15 is electrically connected to a terminal of a motor lead 19 which is connected to a positive brush 18 in the motor.

Figure 1:
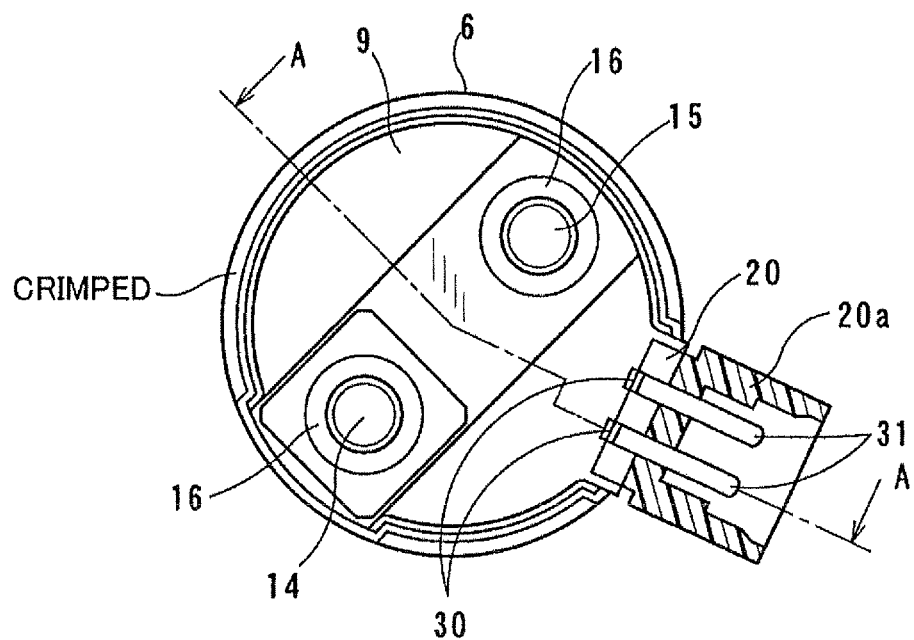
FIG. 1 is a plan view, including a partial cross section, illustrating a resin cover of an electromagnetic switch, as viewed from an axial rear end of the cover, according to a first embodiment of the present invention.
Figure 2:
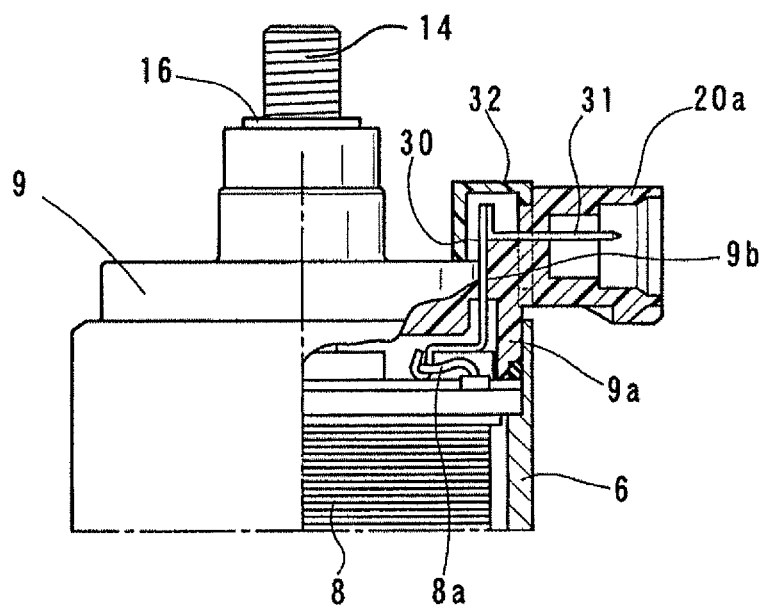
FIG. 2 is a side elevational view taken along a line A-A of FIG. 1, including a partial cross section, illustrating the electromagnetic switch as viewed from the side of the resin cover.

As shown in FIGS. 1 and 3, the resin cover 9 is integrally provided with a terminal anchor block 20 in the radial direction which is perpendicular to the axial direction of the electromagnetic switch 1. The terminal anchor block 20 is provided with a connector fitting member 20a which electrically connects externally provided first and second electric supply lines 21 and 22 to the first and second current-supply terminal members, respectively.

As shown in FIG. 5, the first electric supply line 21 supplies electric power to the first excitation coil 7 from the battery 10, while the second electric supply line 22 supplies electric power to the second excitation coil 8 from the battery 10. The first and second electric supply lines 21 and 22 each have an end at which a power supply connector 23 (see FIG. 6) is provided for common use between the lines 21 and 22. The power supply connector 23 is fitted to the connector fitting member 20a to electrically connect the first and second electric supply lines 21 and 22 to the first and second current-supply terminal members, respectively.

The first and second electric supply lines 21 and 22 are provided with first and second electromagnetic relays 24 and 25, respectively. The operations of the first and second electromagnetic relays 24 and 25 are controlled by an ECU 26 that is an electronic control unit.

As shown in FIG. 5, the electrical contacts mentioned above include a battery-side fixed contact 27, a motor-side fixed contact 28 and a movable contact 29. The battery-side fixed contact 27 is integrally provided with the battery terminal 14. The motor-side fixed contact 28 is integrally provided with the motor terminal 15. The movable contact 29 faces the fixed contacts 27 and 28 and moves in the axial direction of the electromagnetic switch 1. The movable contact 29 electrically connects and disconnects the fixed contacts 27 and 28 in synchronization with the movement of the second plunger 12.

Specifically, when the movable contact 29 is brought into contact with the fixed contacts 27 and 28, current is passed through the fixed contacts 27 and 28 via the movable contact 29 to thereby turn the electrical contacts to an "on" state. When the movable contact 29 is brought out of contact with the fixed contacts 27 and 28, the current supply is interrupted between the fixed contacts 27 and 28 to thereby turn the electrical contacts to an "off" state. The fixed contacts 27 and 28 may be provided separately from the battery terminal 14 and the motor terminal 15, respectively, and electrically and mechanically joined to the battery terminal 14 and the motor terminal 15, respectively.

The first and second current-supply terminal members are each configured by a blade-shaped terminal 30 and an external connection terminal 31, which have long-plate shapes and are made of a terminal material, such as copper or brass. The blade-shaped terminals 30 in the first and second current-supply terminal members have an identical shape. Similarly, the external connection terminals 31 in the first and second current-supply terminal members have an identical shape. Therefore, the commonality of the parts can be achieved.

In the description set forth below, the same reference "30" is used for the blade-shaped terminals in the first and second current-supply terminal members, and the same reference "31" is used for the external connection terminals in the first and second current-supply terminal members.

As shown in FIG. 2, the ends of the blade-shaped terminals 30 on one side are directly or indirectly connected to the first and second excitation coils 7 and 8 in the interior of the resin cover 9. The ends of the blade-shaped terminals 30 on the other side are drawn out of the resin cover 9 through a slit 9b, i.e. a through hole, in the axial direction of the electromagnetic switch 1, the slit 9b being formed in the bottom of the resin cover 9. FIG. 2 exemplifies that, of the first and second excitation coils 7 and 8, the second excitation coil 8, for example, is connected, at its non-grounded end 8a, to the corresponding blade-shaped terminal 30. Similarly, the first excitation coil 7 can also be connected, at its non-grounded end, to the corresponding blade-shaped terminal 30. Specifically, the first excitation coil 7 is disposed below the second excitation coil 8, although not shown in FIG. 2. The non-grounded end of the first excitation coil 7 is permitted to pass through the radial outer periphery of the second excitation coil 8, for example, and be drawn out upward in the figure for connection to the corresponding blade-shaped terminal 30 in the same manner as indicated in FIG. 2.

As shown in FIGS. 1, 2 and 3, each of the external connection terminals 31 has a portion between the ends thereof which is insert-molded in the connector fitting member 20a formed at the terminal anchor block 20. The ends of the external connection terminals 31 on one side are projected toward the center of the resin cover 9 from the back face of the connector fitting member 20a and joined to the respective ends of the blade-shaped terminals 30 on the other side, which are drawn out of the resin cover 9. The ends of the external connection terminals 31 on the other side are drawn out into the interior of the connector fitting member 20a.

As shown in FIG. 2, the ends of the external connection terminals 31 on one side joined to the respective blade-shaped terminals 30 drawn out of the resin cover 9 are each bent in the axial direction (vertical direction as viewed in the figure) of the electromagnetic switch 1 so as to have a shape of an "L" (L shape). The L-shaped bent ends are electrically and mechanically connected to the respective ends of the blade-shaped terminals 30 on the other side such as by resistance welding, brazing or soldering, in a state where the respective flat surfaces are butted against each other, or in a manner of achieving surface-to-surface contact.

In the first and second current-supply terminal members, as shown in FIG. 2, the portions exposed outside the resin cover 9, i.e. the portions of the blade-shaped terminals 30 on the other side and the external connection terminals 31 on one side, the portions including joints between the blade-shaped terminals 30 and the external connection terminals 31, are covered with a cap 32 which is made of resin and provided separately from the resin cover 9. As shown in FIG. 4, the cap 32 is provided with a pair of engaging claws 32a for fixing the cap 32 to the terminal anchor block 20. In fixing the cap 32 to the terminal anchor block 20, the engaging claws 32a are engaged with the rear-face corners of the terminal anchor block 20 so as to bridge the terminal anchor block 20 from above the front face of the terminal anchor block 20 (from above the upper face of the terminal anchor block 20 having the external connection terminals 31 as shown in FIG. 3). It should be appreciated that FIGS. 1 and 3 illustrate a state where the cap 32 is detached.

Hereinafter is described the operation of the starter 2.

When the first electromagnetic relay 24 is turned on by a signal from the ECU 26, power is supplied to the first current-supply to terminal member from the battery 10 to energize the first excitation coil 7. As a result, the first plunger 11 shown in FIG. 5 is attracted to the electromagnet and moved leftward as viewed in FIG. 5. With the movement of the plunger 11, the pinion 3 is pushed via the shift lever 13 in the direction opposite to the motor (rightward as viewed in FIG. 5).

Once the pinion 3 is brought into contact with the ring gear 4 and when the second electromagnetic relay 25 is turned on by a signal from the ECU 26, power is supplied to the second current-supply terminal member from the battery 10 to energize the second excitation coil 8. As a result, the second plunger 12 shown in FIG. 5 is attracted to the electromagnet and moved downward as viewed in FIG. 5. With the movement of the plunger 12, the electrical contacts provided at the power supply circuit of the motor 5 are turned on. Then, an armature 5a of the motor 5 is energized to generate torque in the armature 5a. The torque of the armature 5a is transmitted to the pinion 3. Then, when the pinion 3 is in engagement with the ring gear 4, the torque is transmitted from the pinion 3 to the ring gear 4 to crank up the engine.

The operation of the starter 2 described above is just an example, and thus the operation is not limited to this example. Let us take as an example a vehicle installed with an idle stop system that automatically controls stop and restart of the engine. In such a vehicle, the pinion 3 can be engaged with the ring gear 4 when idle stop is performed but before the rotation of the engine is completely stopped, i.e. while the ring gear 4 is still in rotation.

Specifically, for example, after performing idle stop and when the engine speed has lowered to a level which is lower than an idling engine speed, the first electromagnetic relay 24 may be turned on to energize the first excitation coil 7. In this case, the pinion 3 pushed in the direction opposite to the motor is once brought into contact with an axial end face of the ring gear 4. Since the ring gear 4 is in rotation, at the time point when the ring gear 4 is rotated to a position that enables engagement with the pinion 3, the pinion 3 will be engaged with the ring gear 4.

Then, when engine restarting conditions are met following the starting operation carried out by the driver, a signal is issued from the ECU 26 to turn on the second electromagnetic relay 25 for the energization of the second excitation coil 8. Then, the motor 5 is started to transmit torque to the pinion 3 and to thereby finally restart the engine in a prompt manner.

The first and second current-supply terminal members used for the electromagnetic switch 1 according to the first embodiment each include the blade-shaped terminal 30 which is fitted on through the resin cover 9 in the axial direction of the electromagnetic switch 1, and the external connection terminal 31 which is joined to the blade-shaped terminal 30 in the outside of the resin cover 9. Accordingly, the direction of drawing out each of the external connection terminals 31 is allowed to intersect the axial direction of the electromagnetic switch 1.

In the first embodiment, the ends of the external connection terminals 31 on one side, which are drawn out of the rear face of the connector fitting member 20a, are each bent into the shape of an "L" for joining to the respective ends of the blade-shaped terminals 30 on the other side drawn out of the resin cover 9. Such a joint allows the ends of the external connection terminals 31 on the other side to be drawn out in the radial direction of the electromagnetic switch 1 (the direction perpendicular to the axial direction of the electromagnetic switch 1). Accordingly, the connector fitting member 20a can be formed in the radial direction of the electromagnetic switch 1, and therefore the power supply connector 23 provided at the ends of the first and second electric supply lines 21 and 22 can be fitted to the connector fitting member 20a from the radial direction of the electromagnetic switch 1.

Figure 7:
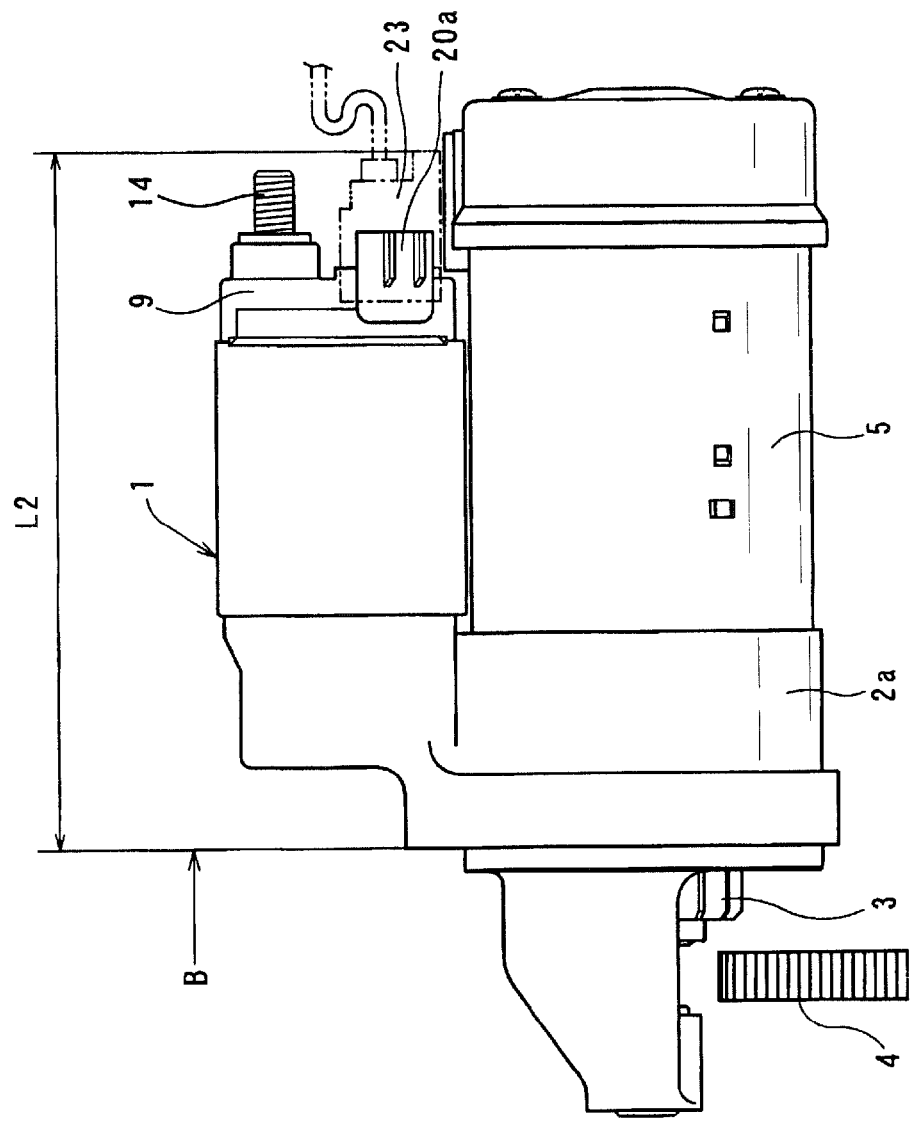
FIG. 7 is a general side elevational view of a starter installing an electromagnetic switch according to a conventional art.

Referring now to FIGS. 6 and 7, let us compare the terminal structure according to the first embodiment described above and the terminal structure of a conventional art. FIG. 6 is a general side elevational view of the starter 2 installing the electromagnetic switch 1 according to the first embodiment. FIG. 7 is a general side elevational view of a starter installing an electromagnetic switch according to a conventional art. In FIG. 7, the components identical with or similar to those illustrated in FIG. 6 are given the same reference numerals.

In FIGS. 6 and 7, references L1 and L2 each represent an axial length in the starter from a surface B of a starter housing 2a, through which the starter is attached to an engine, to an ultimate end of the power supply connector 23. Let us compare the axial lengths L1 and L2. As show in FIG. 7, in the terminal structure of the conventional art, the ultimate end of the power supply connector 23 is positioned outside (rightward in FIG. 7) of the axial end face of the battery terminal 14. Therefore, the axial length L2 is larger than the axial length from the surface B for the attachment to the engine, to the axial end face of the battery terminal 14.

On the other hand, as indicated by the dash-dot-dot line in FIG. 6, in the terminal structure according to the first embodiment, the ultimate end (the side face on the right side as viewed in FIG. 6) of the power supply connector 23 is positioned inside of the axial end face of the battery terminal 14. Therefore, the axial length L1 is made smaller than the axial length from the surface B for the attachment to the engine, to the axial end face of the battery terminal 14.

Thus, the axial length L1 in the terminal structure according to the first embodiment described above is made smaller than the axial length L2 in the terminal structure of the conventional art. In this way, the installation properties of the starter 2 are enhanced.

In each of the first and second current-supply terminal members, an end of the blade-shaped terminal 30 on the other side drawn out of the resin cover 9 and the L-shaped end of the external connection terminal 31 on one side are joined in a state where the respective flat surfaces are butted against each other, or in a manner of achieving a surface-to-surface contact. Therefore, joint strength is well ensured and thus reliability of the joint is enhanced, regardless of the type of the joint, such as a joint obtained by resistance welding, brazing or soldering.

In the first and second current-supply terminal members, the resin cap 32 entirely covers the portions exposed outside the resin cover 9, i.e. the portions of the blade-shaped terminals 30 on the other side and the external connection terminals 31 on one side, the portions including joints between the blade-shaped terminals 30 and the external connection terminals 31. Therefore, the portions of the terminals exposed outside the resin cover 9 are prevented from having foreign matter attached and thus the leakage of current between two poles (between a current-supply terminal member and another current-supply terminal member) can be prevented. Also, the cap 32 can be easily fixed to the terminal anchor block 20 by bringing the pair of engaging claws 32a into engagement with the rear-face corners of the terminal anchor block 20. Therefore, the reliability of the electromagnetic switch 1 is enhanced in the endurance of insulation properties without using so many number of assembling steps.

Further, the external connection terminals 31 each have a portion between the ends on one side and the other side thereof which is insert-molded in the terminal anchor block 20. Therefore, the ends of the external connection terminals 31 on the other side, which are drawn into the interior of the connector fitting member 20a, will not wobble, and thus the connection to respective female terminals of the power supply connector 23 is reliably established.

Furthermore, since the connector fitting member 20a is formed at the terminal anchor block 20, the external connection terminals 31 are electrically connected to the respective female terminals by only fitting the connector fitting member 20a to the power supply connector 23. Thus, wiring work for the electromagnetic switch 1 can be facilitated. In addition, waterproofing properties are easily obtained by having a piece of waterproof rubber, for example, sandwiched between the connector fitting member 20a and the power supply connector 23. Thus, a contact structure having high reliability can be provided.

Further, in the present embodiment, only the change of the resin cover 9 can change the direction of drawing out the external connection terminals 31 with respect to the circumferential direction of the resin cover 9. Specifically, in changing the direction of drawing out the external connection terminals 31, it is not required to change the main components, including the first and second excitation coils 7 and 8, of the electromagnetic switch 1. Specifically, in changing the direction, only the resin cover 9 has to be changed to the one suitable for the direction of drawing out the external connection terminals 31. Therefore, the main components of an electromagnetic switch of the conventional art, except the resin cover 9, are usable in the electromagnetic switch 1.

Second Embodiment

Figure 8:
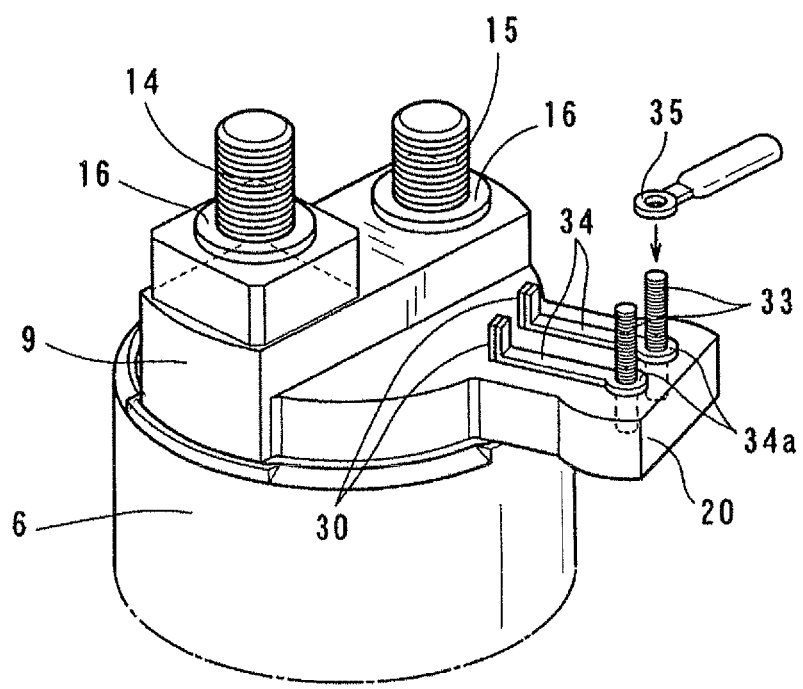
FIG. 8 is a perspective view illustrating a terminal structure of an electromagnetic switch as viewed from the side of a resin cover, according to a second embodiment of the present invention.

Referring to FIG. 8, hereinafter is described a second embodiment of the present invention. In the second embodiment, the components identical with or similar to those in the first embodiment are given the same reference numerals for the sake of omitting explanation.

In the second embodiment, an example is described in which bolt terminals 33 are used at connecting portions in the first and second electric supply lines 21 and 22. The bolt terminals 33 refer to the terminals each having a shape of a bolt whose outer periphery is threaded to provide a male screw, similar to the battery terminal 14 or the motor terminal 15 as mentioned in the first embodiment.

The first and second current-supply terminal members each include the blade-shaped terminal 30 as shown in FIG. 8, a relay metal terminal plate 34 and a bolt terminal 33.

Similar to the first embodiment, the blade-shaped terminals 30 have ends on one side, which are directly or indirectly connected to the first and second excitation coils 7 and 8 in the interior of the resin cover 9. The blade-shaped terminals 30 have ends on the other side, which are drawn out of the resin cover 9 through the slit 9b, i.e. a through hole, in the axial direction of the electromagnetic switch 1, the slit 9b being formed in the bottom of the resin cover 9 (see FIG. 2).

The relay metal terminal plates 34 have ends on one side, which are electrically and mechanically joined to the respective ends of the blade-shaped terminals 30 on the other side, which are drawn out of the resin cover 9. The relay metal terminal plates 34 have ends on the other side, which are drawn out in the radial direction perpendicular to the axial direction of the electromagnetic switch 1. The radially drawn out ends of the relay metal terminal plates 34 on the other side are formed into annular terminals 34a which are electrically connected to the respective bolt terminals 33.

Each of the bolt terminals 33 has one end inserted into a fitting hole formed in the terminal 34a of each relay metal terminal plate 34, for electrical connection with the relay metal terminal plate 34, and the other end insert-molded in the terminal anchor block 20 integrally provided with the resin cover 9. The bolt terminals 33 are projected from the terminal anchor block 20 in the upward direction, as viewed in FIG. 8. The portions of the bolt terminals 33 projected upward from the terminal anchor block 20 have outer peripheries fitted to respective annular terminals 35 (see FIG. 8) provided at the ends of the first and second electric supply lines 21 and 22 (see FIG. 5) to electrically connect the bolt terminals 33 to the first and second electric supply lines 21 and 22.

The terminal structure shown in the second embodiment uses the bolt terminals 33 at the connecting portions in the first and second electric supply lines 21 and 22. Thus, the first and second electric supply lines 21 and 22 are electrically connected to the respective bolt terminals 33 by fitting the annular terminals 35 to the outer peripheries of the respective bolt terminals 33, instead of establishing electrical connection using the connector fitting (the fitting between the connector fitting member 20a and the power supply connector 23) as in the first embodiment.

In this case, no installation constraints are imposed by the length of the axial projection of the terminal structure including the power supply connector 23. Therefore, compared to the terminal structure of the conventional art in which the power supply connector 23 is axially fitted to the ends of the blade-shaped terminals 30 drawn out of the resin cover 9, the length of the projection in the axial direction can be shortened, thereby enhancing the installation properties for an engine.

(Modifications)

In the first embodiment, the connector fitting member 20a has been formed in the terminal anchor block 20. However, in place of the connector fitting member 20a, a flat connector contact surface may be formed in the terminal anchor block 20, so that the ends of the external connection terminals 31 on the other side, which are extended in the direction intersecting the axial direction of the electromagnetic switch 1, can be projected from the connector contact surface. In this case, in fitting the power supply connector 23 to the ends of the external connection terminals 31, an end face of the power supply connector 23 is brought into contact with the connector contact surface formed in the terminal anchor block 20. Based on this contact, the external connection terminals 31 are determined as being reliably in contact with the respective female terminals. Therefore, contact failure between the external connection terminals 31 and the female terminals can be prevented, which would have been caused such as by the insufficient fitting of the power supply connector 23.

The first and second embodiments described above have each introduced an example of the electromagnetic switch 1 including the first and second excitation coils 7 and 8, and the first and second current-supply terminal members for supplying current to the first and second excitation coils 7 and 8, respectively. However, the configuration of the present invention can also be applied to an electromagnetic switch including a single excitation coil and a current-supply terminal member with a single pole, the current-supply terminal member supplying current to the excitation coil.

Hereinafter, aspects of the above-described embodiments will be summarized.

As an aspect of the embodiment, an electromagnetic switch is provided which includes: an excitation coil which generates magnetomotive force when current is passed therethrough; a switch frame which accommodates the excitation coil and generates a flux path allowing magnetic flux generated by the magnetomotive force of the excitation coil to pass therethrough; a resin cover which is assembled into the switch frame to cover an opening on one end side of the switch frame; and at least one current-supply terminal member which receives power via an electric supply line and energizes the excitation coil, wherein the current-supply terminal member includes: a blade-shaped terminal whose end on one side is directly or indirectly connected to the excitation coil and whose end on the other side is drawn out of the resin cover through the resin cover in the axial direction of the electromagnetic switch; and a plate-shaped external connection terminal whose end on one side is electrically and mechanically joined to an end on the other side of the blade-shaped terminal and whose end on the other side is drawn out in the direction intersecting the axial direction of the electromagnetic switch, a portion between the ends of the external connection terminal being insert-molded in a terminal anchor block which is integrally provided with the resin cover, and a female terminal of a power supply connector provided at an end of the electric supply line is fitted to and electrically connected to the end on the other side of the external connection terminal.

The current-supply terminal members include the blade-shaped terminals which are fitted on through the resin cover in the axial direction of the electromagnetic switch, and the plate-shaped external connection terminals electrically and mechanically joined, outside the resin cover, to the respective blade-shaped terminal. Therefore, the direction of drawing out the external connection terminals is permitted to intersect the axial direction of the electromagnetic switch. For example, by drawing out the ends of the external connection terminals in the radial direction of the electromagnetic switch (the direction perpendicular to the axial direction of the electromagnetic switch), the female terminals of the power supply connector can be fitted and connected to the respective external connection terminals from the radial direction of the electromagnetic switch. In this case, the axial length of the terminal structure including the power supply connector is reduced compared with the terminal structure using the blade-shaped terminals of a conventional art. In this way, the installation properties of the electromagnetic switch are enhanced.

In each of the external connection terminals, a portion between the ends thereof is insert-molded in the terminal anchor block which is integrally provided with the resin cover. Therefore, the ends of the external connection terminals, which are extended intersecting the axial direction of the electromagnetic switch, will not wobble, and thus the connection with the respective female terminals of the power supply connector is reliably established.

Further, according to the embodiments, only the change of the resin cover can change the direction of drawing out the external connection terminals with respect to the circumferential direction of the resin cover. Specifically, in changing the direction of drawing out the external connection terminals, the main components, including the excitation coils, of the electromagnetic switch are not required to be changed, but only the resin cover has to be changed to the one suitable for the direction of drawing out the external connection terminals. Therefore, the main components of an electromagnetic switch of the conventional art, except the resin cover, are usable in the electromagnetic switch of the embodiments. The electromagnetic switch of the conventional art here refers to one having a terminal structure in which the ends of blade-shaped terminals are drawn out to the outside in the axial direction of the electromagnetic switch from inside and through a resin cover, and female terminals of a power supply connector are connected to the respective drawn out ends of the blade-shaped terminals.

In the electromagnetic switch, the terminal anchor block is provided with a connector fitting member which fits to the power supply connector.

Thus, by forming the connector fitting member at the terminal anchor block, the power supply connector is fitted to the connector fitting member to establish electrical connection between the external connection terminals and the respective female terminals. Therefore, wiring work for the electromagnetic switch is facilitated. In addition, waterproofing properties are easily obtained by having a piece of waterproof rubber, for example, sandwiched between the connector fitting member and the power supply connector. Thus, a contact structure having high reliability can be provided.

In the electromagnetic switch, the terminal anchor block has a connector contact surface with which an end face of the power supply connector is brought into contact, and the end on the other side of the external connection terminal is projected from the connector contact surface.

Thus, in fitting the power supply connector to the ends of the external connection terminals, an end face of the power supply connector is brought into contact with the connector contact surface formed in the terminal anchor block. Based on this contact, the external connection terminals are determined as being reliably in contact with the respective female terminals. Therefore, contact failure between the external connection terminals and the female terminals can be prevented, which would have been caused such as by the insufficient fitting of the power supply connector.

In the electromagnetic switch, one end of the external connection terminal on one side is bent in the axial direction of the electromagnetic switch so as to have an L shape, and the bent end is connected to the end of the blade-shaped terminal on the other side drawn out of the resin cover, in a state where the bent end and the end of the blade-shaped terminal are butted against each other in the thickness direction thereof.

Thus, the ends of the blade-shaped terminals, which are drawn out of the resin cover, and the L-shaped ends of the external connection terminals are butted against each other in the thickness direction of the terminal plates. In other words, an end of each blade-shaped terminal and an end of each external connection terminal are joined in a manner of achieving a surface-to-surface contact. With this configuration, in the event that the contact surfaces of the terminals are slightly displaced from each other, good joint strength is ensured absorbing the displacement. Therefore, reliability of the joint is enhanced, regardless of the type of the joint, such as a joint obtained by resistance welding, brazing or soldering.

As another aspect of the embodiment, an electromagnetic switch is provided which includes: an excitation coil which generates magnetomotive force when current is passed therethrough; a switch frame which accommodates the excitation coil and generates a flux path allowing magnetic flux generated by the magnetomotive force of the excitation coil to pass therethrough; a resin cover which is assembled into the switch frame to cover an opening on one end side of the switch frame; and at least one current-supply terminal member which receives power via an electric supply line and energizes the excitation coil, wherein the current-supply terminal member includes: a blade-shaped terminal whose end on one side is directly or indirectly connected to the excitation coil and whose end on the other side is drawn out of the resin cover through the resin cover in the axial direction of the electromagnetic switch; a relay metal terminal plate whose end on one side is electrically and mechanically joined to an end on the other side of the blade-shaped terminal, and whose end on the other side is drawn out in the direction intersecting the axial direction of the electromagnetic switch and has a fitting hole; and a bolt terminal whose one end is inserted into the fitting hole of the relay metal terminal plate for electrical connection with the relay metal terminal plate, and whose another end is insert-molded in the terminal anchor block integrally provided with the resin cover, and a portion of the bolt terminal projected from the terminal anchor block has an outer periphery fitted to an annular terminal provided at the end of the electric supply line to electrically connect the bolt terminal to the electric supply line.

In the current-supply terminal members of the embodiment, an end of each of the bolt terminals is fixed to the terminal anchor block integrally provided with the resin cover. The bolt terminals are electrically connected, via the respective relay metal terminal plates, to the respective blade-shaped terminals, which are fitted on through the resin cover in the axial direction of the electromagnetic switch.

In this terminal structure, unlike the connection in the conventional art using the power supply connector as mentioned above, the annular terminals provided at the respective ends of the electric supply lines are fitted and connected to the outer peripheries of the respective bolt terminals to connect the electric supply lines to the respective bolt terminals. Therefore, with this terminal structure, no installation constraints are imposed by the length of the axial projection of the terminal structure including the power supply connector. As a result, comparing with the terminal structure of the conventional art in which the power supply connector is fitted to the ends of the blade-shaped terminals drawn out of the resin cover, the length of the projection in the axial direction can be shortened, thereby enhancing the installation properties of the electromagnetic switch.

Further, in the embodiments, only the change of the resin cover can change the attachment position of the bolt terminals with respect to the circumferential direction of the resin cover. Specifically, in changing the attachment position of the bolt terminals, it is not required to change the main components, including the excitation coils, of the electromagnetic switch, but only the resin cover has to be changed to the one suitable for the attachment position of the bolt terminals. Therefore, main components of an electromagnetic switch of the conventional art, except the resin cover, are usable in the electromagnetic switch of the embodiments.

The electromagnetic switch of the conventional art here refers to one having a terminal structure in which the ends of blade-shaped terminals are drawn out to the outside in the axial direction of the electromagnetic switch from inside and through a resin cover, and female terminals of a power supply connector are connected to the respective drawn out ends of the blade-shaped terminals.

In the electromagnetic switch, one end of the relay metal terminal plate on one side is bent in the axial direction of the electromagnetic switch so as to have an L shape, and the bent end is connected to the end of the blade-shaped terminal on the other side drawn out of the resin cover, in a state where the bent end and the end of the blade-shaped terminal are butted against each other in the thickness direction thereof.

Thus, the ends of the blade-shaped terminals, which are drawn out of the resin cover, and the respective L-shaped ends of the relay metal terminal plates are butted against each other in the thickness direction of the terminal plates. In other words, an end of each blade-shaped terminal and an end of each relay metal terminal plate are joined in a manner of achieving surface-to-surface contact. With this configuration, in the event that the contact surfaces of the blade-shaped terminal and the relay metal terminal plate are slightly displaced from each other, good joint strength is ensured absorbing the displacement. Therefore, reliability of the joint is enhanced, regardless of the type of the joint, such as a joint obtained by resistance welding, brazing or soldering.

In the electromagnetic switch, a plurality of the current-supply terminal members are provided, further including a resin cap which covers portions of the current-supply terminal members exposed outside the resin cover, wherein the cap includes an engaging claw which is engaged with the terminal anchor block to fix the cap to the terminal anchor block.

For example, an electromagnetic switch installed in a vehicle starter is restricted in the outer diameter dimension of the resin cover. What is more, a battery terminal and a motor terminal are attached to the resin cover besides current-supply terminal members. Therefore, if two or more current-supply terminal members are provided, it is difficult to well ensure the creepage distance between two poles (between a current-supply terminal member and another current-supply terminal member). If foreign matters, for example, are attached to the portions of the current-supply terminal members, which portions are exposed outside the resin cover, there is a concern that current leakage may be caused between the poles via the foreign matters. Therefore, the terminals are required to be prevented from being attached with foreign matters.

From a viewpoint of preventing the increase of the number of assembling steps, it is desirable that the means for preventing the attachment of foreign matters to the terminals is realized as easily as possible.

In this regard, according to the embodiments, a resin cap is provided separately from the resin cover. Using the cap, the portions exposed outside the resin cover are covered to thereby prevent the attachment of foreign matters to the terminals. Further, the cap is provided with engaging claws which are brought into engagement with the terminal anchor block to fix the cap to the terminal anchor block.

With this configuration, the portions of the terminals exposed outside the resin cover are covered with the cap with easy assembling work. Therefore, the reliability of the electromagnetic switch is enhanced in the endurance of insulation properties without using so many number of assembling steps.

It will be appreciated that the present invention is not limited to the configurations described above, but any and all modifications, variations or equivalents, which may occur to those who are skilled in the art, should be considered to fall within the scope of the present invention.

What is claimed is:

1. An electromagnetic switch, comprising:
an excitation coil which generates magnetomotive force when current is passed therethrough;
a switch frame which accommodates the excitation coil and generates a flux path allowing magnetic flux generated by the magnetomotive force of the excitation coil to pass therethrough;
a resin cover which is assembled into the switch frame to cover an opening on one end side of the switch frame; and
at least one current-supply terminal member which receives power via an electric supply line and energizes the excitation coil,
the current-supply terminal member including:
a blade-shaped terminal whose end on one side is directly connected to the excitation coil and whose end on the other side is drawn out of the resin cover through the resin cover in the axial direction of the electromagnetic switch;
a relay metal terminal plate whose end on one side is electrically and mechanically joined to an end on the other side of the blade-shaped terminal, and whose end on the other side is drawn out in the direction intersecting the axial direction of the electromagnetic switch and has a fitting hole; and
a bolt terminal whose one end is inserted into the fitting hole of the relay metal terminal plate for electrical connection with the relay metal terminal plate, and whose another end is insert-molded in the terminal anchor block integrally provided with the resin cover; and
a portion of the bolt terminal projected from the terminal anchor block has an outer periphery fitted to an annular terminal provided at the end of the electric supply line to electrically connect the bolt terminal to the electric supply line.

2. The electromagnetic switch according to claim 1, wherein
one end of the relay metal terminal plate on one side is bent in the axial direction of the electromagnetic switch so as to have an L shape, and
the bent end is connected to the end of the blade-shaped terminal on the other side drawn out of the resin cover, in a state where the bent end and the end of the blade-shaped terminal are butted against each other in the thickness direction thereof.

3. The electromagnetic switch according to claim 1, wherein
a plurality of the current-supply terminal members are provided, further comprising a resin cap which covers portions of the current-supply terminal members exposed outside the resin cover, wherein
the cap includes an engaging claw which is engaged with the terminal anchor block to fix the cap to the terminal anchor block.

4. An electromagnetic switch, comprising: an excitation coil which generates magnetomotive force when current is passed therethrough; a switch frame which accommodates the excitation coil and generates a flux path allowing magnetic flux generated by the magnetomotive force of the excitation coil to pass therethrough; a resin cover which is assembled into the switch frame to cover an opening on one end side of the switch frame; and at least one current-supply terminal member which receives power via an electric supply line and energizes the excitation coil, the current-supply terminal member including: a blade-shaped terminal whose end on one side is indirectly connected to the excitation coil and whose end on the other side is drawn out of the resin cover through the resin cover in the axial direction of the electromagnetic switch; a relay metal terminal plate whose end on one side is electrically and mechanically joined to an end on the other side of the blade-shaped terminal, and whose end on the other side is drawn out in the direction intersecting the axial direction of the electromagnetic switch and has a fitting hole; and a bolt terminal whose one end is inserted into the fitting hole of the relay metal terminal plate for electrical connection with the relay metal terminal plate, and whose another end is insert-molded in the terminal anchor block integrally provided with the resin cover; and a portion of the bolt terminal projected from the terminal anchor block has an outer periphery fitted to an annular terminal provided at the end of the electric supply line to electrically connect the bolt terminal to the electric supply line.

* * * * *